US012312956B2

(12) United States Patent
Magnotti et al.

(10) Patent No.: US 12,312,956 B2
(45) Date of Patent: May 27, 2025

(54) ROBUST PLASMA BLAST PROBE TIP

(71) Applicant: Petram Technologies, Inc., Jersey City, NJ (US)

(72) Inventors: Nicholas Magnotti, Boston, MA (US); Frank A. Magnotti, II, Jersey City, NJ (US)

(73) Assignee: Petram Technologies, Inc., Jersey City, NJ (US)

( * ) Notice: Subject to any disclaimer, the term of this patent is extended or adjusted under 35 U.S.C. 154(b) by 473 days.

(21) Appl. No.: 17/898,450

(22) Filed: Aug. 29, 2022

(65) Prior Publication Data

US 2022/0403739 A1 Dec. 22, 2022

Related U.S. Application Data

(63) Continuation-in-part of application No. 17/011,471, filed on Sep. 3, 2020, now Pat. No. 11,536,124.

(51) Int. Cl.

| | |
|---|---|
| ***E21C 37/18*** | (2006.01) |
| ***F42D 3/04*** | (2006.01) |
| ***H05H 1/52*** | (2006.01) |

(52) U.S. Cl.

CPC ................ *E21C 37/18* (2013.01); *F42D 3/04* (2013.01); *H05H 1/52* (2013.01)

(58) Field of Classification Search

CPC . E21C 37/18; F42D 3/04; F42D 1/045; F42D 1/05; E21B 43/2401; E21B 43/247

USPC ................. 299/14, 16; 175/16; 166/63, 249; 102/313, 327

See application file for complete search history.

(56) References Cited

U.S. PATENT DOCUMENTS

| | | | | |
|---|---|---|---|---|
| 3,621,916 | A * | 11/1971 | Smith, Jr. | ............... E21B 29/02 102/306 |
| 3,679,007 | A | 7/1972 | O Hare | |
| 3,763,610 | A | 10/1973 | Ballew | |
| 4,074,758 | A | 2/1978 | Scott | |
| 4,169,503 | A | 10/1979 | Scott | |
| 4,345,650 | A | 8/1982 | Wesley | |
| 4,479,680 | A | 10/1984 | Wesley | |
| 4,653,697 | A | 3/1987 | Codina | |
| 4,741,405 | A | 5/1988 | Moeny et al. | |
| 4,806,153 | A | 2/1989 | Sakai et al. | |
| 5,004,050 | A | 1/1991 | Sizonenko et al. | |
| 4,997,044 | A | 3/1991 | Stack | |

(Continued)

FOREIGN PATENT DOCUMENTS

FR 3010844 A1 3/2015

OTHER PUBLICATIONS

CN 112781456 (Year: 2021).*

*Primary Examiner* — Sunil Singh
(74) *Attorney, Agent, or Firm* — Richard A. Baker, Jr.

(57) ABSTRACT

A system and apparatus for plasma blasting comprises a borehole, with a novel blast probe, the probe comprising a high voltage electrode and a ground casing tube with a ground and/or electrode deflector. The ground and/or electrode deflector focuses a plasma blast through openings in the probe, directing the blast force away from the ends of the probe, wherein at least a portion of the high voltage electrode and the ground electrode are submerged in the blast media. The blasting media comprises water alone or in combination with other materials. The robust blast probe permits the aiming of the blast outside of the probe.

20 Claims, 8 Drawing Sheets

(56) References Cited

U.S. PATENT DOCUMENTS

| | | | | |
|---|---|---|---|---|
| 5,106,164 | A | 4/1992 | Kitzinger et al. | |
| 5,301,169 | A | 4/1994 | Baria et al. | |
| 5,549,046 | A | 8/1996 | Widner et al. | |
| 5,573,307 | A | 11/1996 | Wilkinson et al. | |
| 5,773,750 | A | 6/1998 | Jae et al. | |
| 6,227,293 | B1 | 5/2001 | Huffman et al. | |
| 6,283,555 | B1 | 9/2001 | Arai et al. | |
| 6,457,778 | B1 | 10/2002 | Chung et al. | |
| 6,499,536 | B1 | 12/2002 | Ellingsen | |
| 6,761,416 | B2 | 7/2004 | Moeny | |
| 6,935,702 | B2 | 8/2005 | Okazaki et al. | |
| 8,628,146 | B2 | 1/2014 | Baltazar-Lopez et al. | |
| 9,896,917 | B2 | 2/2018 | Sizonenko et al. | |
| 2001/0011590 | A1 | 8/2001 | Thomas | |
| 2003/0051870 | A1 * | 3/2003 | Robertson | E21B 29/02 166/55.7 |
| 2006/0038437 | A1 | 2/2006 | Moeny | |
| 2007/0292215 | A1 | 12/2007 | Kim | |
| 2010/0270038 | A1 | 10/2010 | Looney et al. | |
| 2011/0139441 | A1 * | 6/2011 | Zolezzi Garreton | E21B 43/003 367/83 |
| 2014/0027110 | A1 | 1/2014 | Ageev et al. | |
| 2014/0251599 | A1 | 9/2014 | Linetskiy | |
| 2017/0002535 | A1 | 7/2017 | Surjaatmadja | |
| 2019/0177944 | A1 | 6/2019 | Magnotti et al. | |
| 2019/0186249 | A1 | 6/2019 | Alexandrov et al. | |
| 2019/0186886 | A1 * | 6/2019 | Alexandrov | F42D 1/08 |
| 2019/0194882 | A1 | 6/2019 | Magnotti et al. | |
| 2019/0271220 | A1 | 9/2019 | Magnotti et al. | |

* cited by examiner

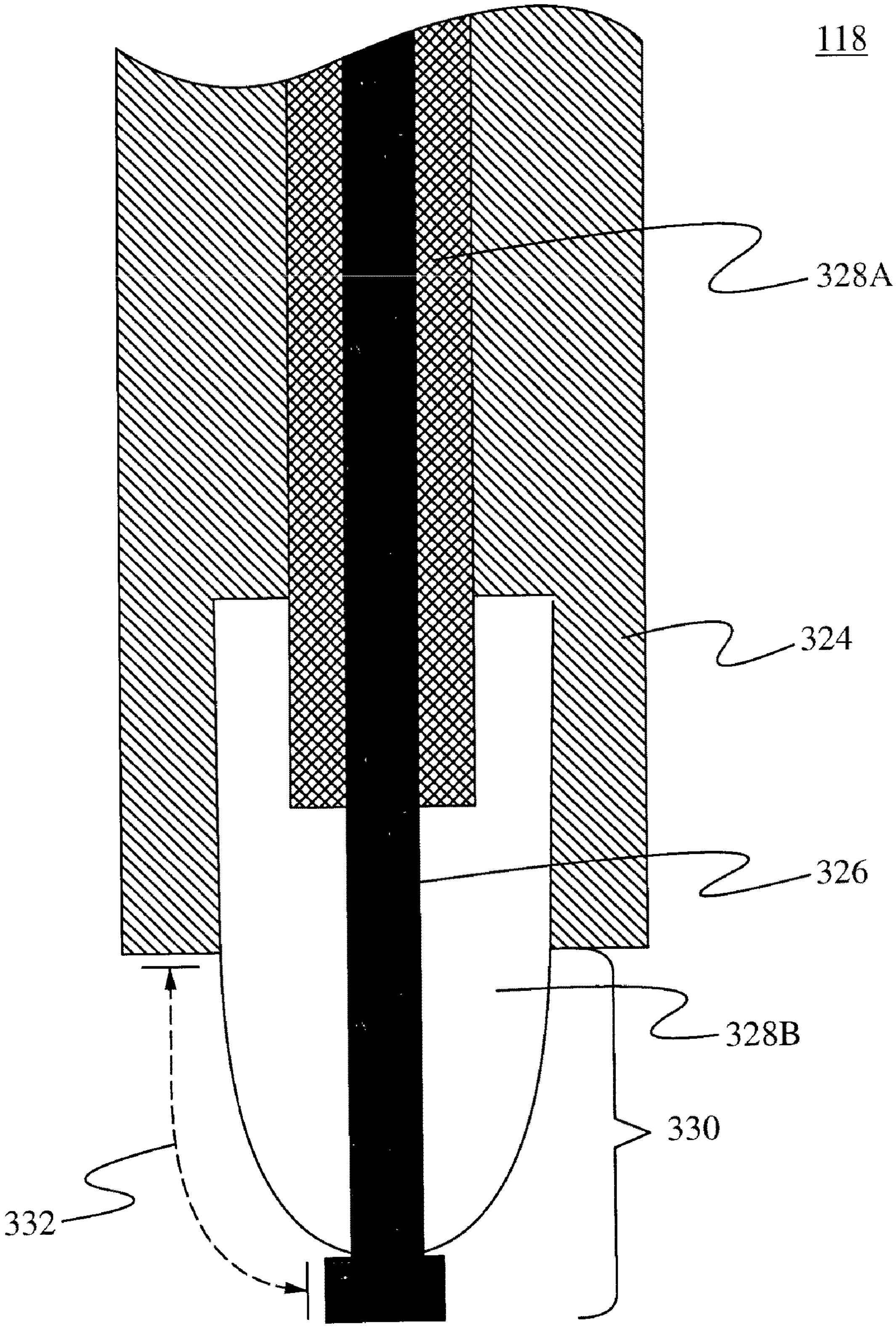
Fig. 3 Prior art

ROBUST PLASMA BLAST PROBE TIP

CROSS REFERENCE TO RELATED APPLICATIONS

This patent application is a continuation in part patent application of U.S. patent application Ser. No. 17/011,471, entitled “A Novel Sliced and Elliptical Head Probe for Plasma Blast Applications”, filed on Sep. 3, 2020 by Frank A. Magnotti I I, Brian Wells, Stevie Best, said application incorporated herein in its entirety by reference.

This non-provisional application draws from U.S. Pat. No. 8,628,146, filed by Martin Baltazar-Lopez and Steve Best, issued on Jan. 14, 2010, entitled “Method of and apparatus for plasma blasting”, U.S. patent application Ser. No. 16/279,903, “Apparatus for Plasma Blasting” and U.S. patent application Ser. No. 16/409,607, “Novel Multi-Firing Swivel Head Probe for Electro-Hydraulic Fracturing in Down Hole Fracking Applications”. The entire patent and patent applications are entirely incorporated herein by reference.

BACKGROUND

Technical Field

The present invention relates to the field of improved plasma blasting. More specifically, the present invention relates to the field of using an head probe for plasma blasting.

Description of the Related Art

The field of surface processing for the excavation of hard rock generally comprises conventional drilling and blasting. Specifically, whether for mining or civil construction, the excavation process generally includes mechanical fracturing and crushing as the primary mechanism for pulverizing/excavating rock. Many of these techniques incorporate the use of chemical explosives. However, these techniques, while being able to excavate the hardest rocks at acceptable efficiencies, are unavailable in many situations where the use of such explosives is prohibited due to safety, vibration, and/or pollution concerns.

An alternate method of surface processing for the excavation of hard rock incorporates the use of electrically powered plasma blasting. In this method, a capacitor bank is charged over a relatively long period of time at a low current, and then discharged in a very short pulse at a very high current into a blasting probe comprised of two or more electrodes immersed in a fluid media. The fluid media is in direct contact with the solid substance or sample to be fractured. These plasma blasting methods however, have been historically expensive due to their inefficiency.

Previous plasma blasting probes suffered from difficulties in reusability due to the lack of control of the direction of the plasma spark. This lack of control also prevented the aiming of the shock waves from the blast into a desired direction. The disclosure herein describes an improved probe for focusing plasma blasts.

In another application of the probes described herein is in creating specific, improved piling and anchor structures as described in U.S. Pat. No. 10,577,767, “In-situ Piling and Anchor Shaping using Plasma Blasting”, issued on Mar. 3, 2020 and U.S. Pat. No. 10,760,239, “In-situ Piling and Anchor Shaping using Plasma Blasting”, issued on Sep. 1, 2020, both applications incorporated herein by reference in their entirety.

Still another application of the probes is in the removal of pavement structures, as described in U.S. Pat. No. 10,767,479, “Method and Apparatus for Removing Pavement Structures using Plasma”, issued Sep. 8, 2020, said application incorporated herein by reference in its entirety.

Another use of these blasting probes is in fracking. Fracking is the process of injecting liquid at high pressure into subterranean rocks, boreholes, etc., so as to force open existing fissures and extract oil or gas. The liquid may be a mixture of water, silica sand and propellant chemicals. Current methods are usually a single chemical explosive blast and yield single dimension crack propagation on the order of ten feet. The propellant fills these cracks, allowing the silica sand in the propellant keeps these cracks open for the gas production process later. Multiple environmental issues exist with the use of large amounts of liquid and contaminating existing water supplies and exposing households to flammable gases. And these methodologies are single use, requiring significant downtime to place subsequent explosives downhole.

Some embodiments of fracking use a tool called a perforation gun which slides along the casing, firing rounds of molten metal through the casing and into the shale, producing cracks connecting underground gas pockets to the pipeline.

An alternate method of fracking of oils and gas boreholes incorporates the use of electrically powered plasma blasting. In this method, a capacitor bank is charged over a relatively long period of time at a low current, and then discharged in a very short pulse at a very high current into a blasting probe comprised of two or more electrodes immersed in a fluid media. The fluid media is in direct contact with the borehole wall to be fractured. These plasma blasting methods however, have been historically expensive due to their inefficiency.

Boreholes range from tens of feet to tens of thousands of feet. This creates both temperature, pressure and physical constraints especially in the area of the bend where it transitions from a vertical to a horizontal section. These holes vary in size from a few inches to 4 feet in diameter and the horizontal section can also be thousands of feet. The boreholes may be a casing reinforced with concrete.

Previous plasma blasting downhole has suffered from control and reusability issues. The probes suffered from difficulties in reusability due to the lack of control of the direction of the plasma spark. This lack of control also prevented the aiming of the shock waves from the blast into a desired direction.

The present set of inventions describe an improved probe that allows more control of the downhole plasma blast as well as the ability to execute multiple plasma blasts within a short period of time.

SUMMARY OF THE INVENTION

The present document describes a blasting system that is made up of a borehole with a blast probe positioned within the borehole. The blast probe is made up of a high voltage electrode, a dielectric material surrounding the high voltage electrode, a ground casing tube surrounding the dielectric material, where the ground casing tube is connected to an electrical ground, and a single opening in the ground casing tube, where the opening extends through the dielectric material to the high voltage electrode, so that the high voltage electrode is exposed. The blasting system also includes a blast media made up of water or other incompressible fluid where the high voltage electrode and the ground casing tube are submerged in the blast media.

The system could also include a capacitor assembly electrically connected to the high voltage electrode through a high voltage wire within a transmission cable. It could also include a ground wire within the transmission is electrically connected between the capacitor assembly and the ground casing tube. The capacitor assembly could be positioned within the borehole. The single opening in the ground casing tube could be positioned in the borehole at a location to focus a plasma blast. The opening in the ground casing tube could be elliptical, circular, or another shape. The opening could be between 5 and 30 degrees wide. The dielectric material could be a G10 insulator.

A blast probe apparatus is also described herein. The blast probe is made up of a high voltage electrode, a dielectric material surrounding the high voltage electrode, a ground casing tube surrounding the dielectric material, where the ground casing tube connected to an electrical ground, and a single opening in the ground casing tube, said opening extending through the dielectric material to the high voltage electrode, such that the high voltage electrode is exposed.

The high voltage electrode and the ground casing tube could be brass, steel, or other materials. The dielectric material could be a G10 insulator, perhaps made of high-pressure fiberglass laminate. The opening in the ground casing tube could be elliptical, circular, or another shape. The blast probe could include a bottom probe plate screwed into the ground casing tube and could include a top probe plate screwed into the ground casing tube The top probe plate could have a hole in the center, and the hole could have a steel tube screwed into the hole in the top probe plate.

BRIEF DESCRIPTION OF FIGURES

FIG. 3 shows a close-up view of the blasting probe comprising two dielectric separators for high energy blasting in accordance with some embodiments of the Present Application.

DETAILED DESCRIPTION OF THE INVENTION

Figure 1:
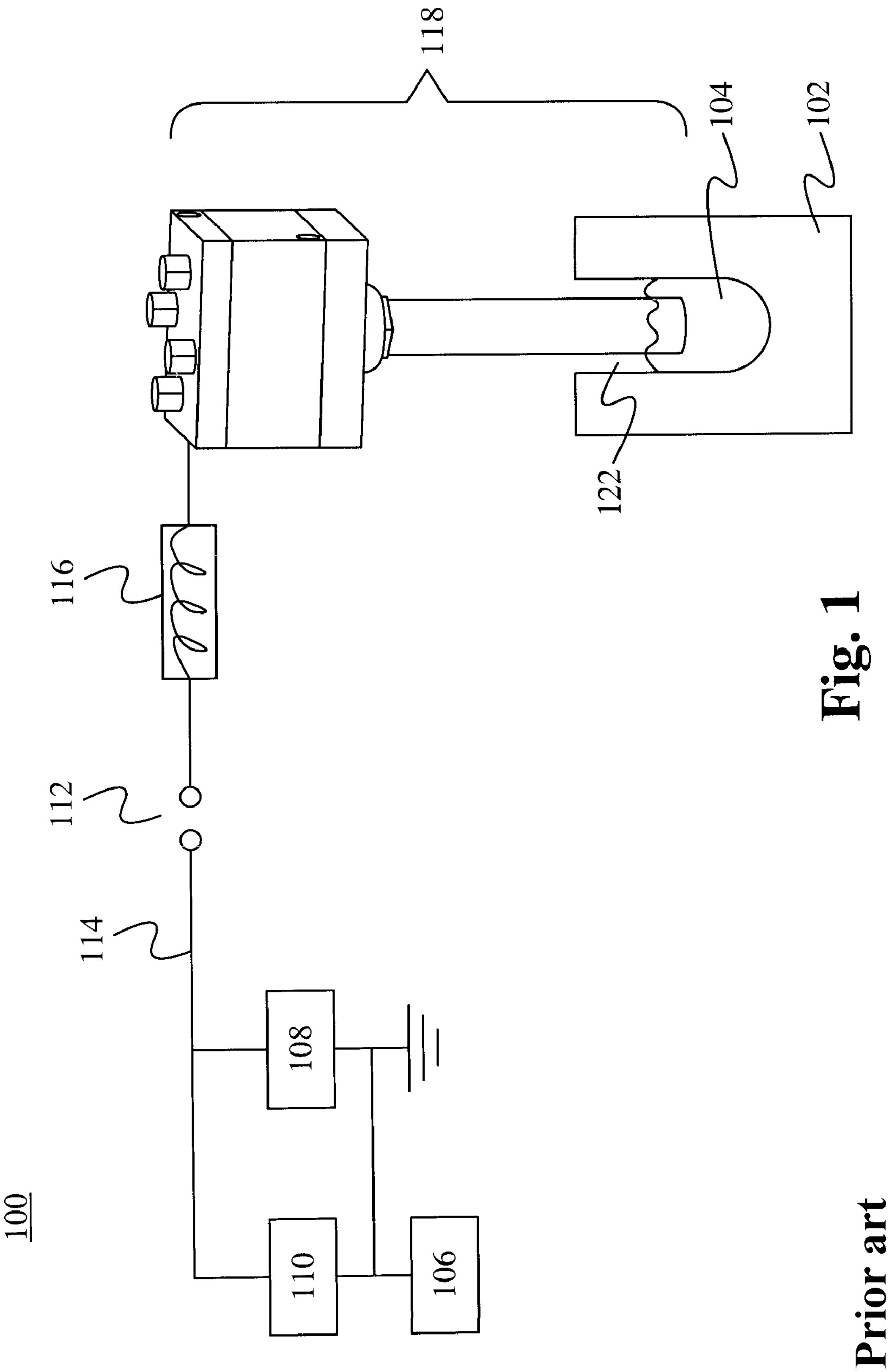
Fig. 1 Prior art
FIG. 1 shows the plasma blasting system in accordance with some embodiments of the Present Application.

FIG. 1 illustrates a plasma blasting system 100 for fracturing a solid 102 in accordance with some embodiments where electrical energy is deposited at a high rate (e.g a few microseconds), into a blasting media 104 (e.g. an electrolyte), wherein this fast discharge in the blasting media 104 creates plasma confined in a borehole 122 within the solid 102. A pressure wave created by the discharge plasma emanates from the blast region thereby fracturing the solid 102. In the oil and gas fracking embodiment, the probe 118 is placed into the oil or gas well at the depth where the fracking is to occur.

In some embodiments, the plasma blasting system 100 comprises a power supply 106, an electrical storage unit 108, a voltage protection device 110, a high voltage switch 112, transmission cable 114, an inductor 116, a blasting probe 118 and a blasting media 104. In some embodiments, the plasma blasting system 100 comprises any number of blasting probes and corresponding blasting media. In some embodiments, the inductor 116 is replaced with the inductance of the transmission cable 114. Alternatively, the inductor 116 is replaced with any suitable inductance means as is well known in the art. The power supply 106 comprises any electrical power supply capable of supplying a sufficient voltage to the electrical storage unit 108. The electrical storage unit 108 comprises a capacitor bank or any other suitable electrical storage means. The voltage protection device 110 comprises a crowbar circuit, with voltage-reversal protection means as is well known in the art. The high voltage switch 112 comprises a spark gap, an ignitron, a solid-state switch, or any other switch capable of handling high voltages and high currents. In some embodiments, the transmission cable 114 comprises a coaxial cable. Alternatively, the transmission cable 114 comprises any transmission cable capable of adequately transmitting the pulsed electrical power.

In some embodiments, the power supply 106 couples to the voltage protection device 110 and the electrical storage unit 108 via the transmission cable 114 such that the power supply 106 is able to supply power to the electrical storage unit 108 through the transmission cable 114 and the voltage protection device 110 is able to prevent voltage reversal from harming the system. In some embodiments, the power supply 106, voltage protection device 110 and electric storage unit 108 also couple to the high voltage switch 112 via the transmission cable 114 such that the switch 112 is able to receive a specified voltage/current from the electric storage unit 108. The switch 112 then couples to the inductor 116 which couples to the blasting probe 118 again via the transmission cable 114 such that the switch 112 is able to selectively allow the specified voltage/amperage received from the electric storage unit 108 to be transmitted through the inductor 116 to the blasting probe 118.

In the oil and gas embodiment, the distance from the power supply 106 and the probe 118 can be thousands of feet down hole into the oil/gas well. This distance prevents the delivery of a sufficient pulse of electricity to the probe 118. To solve this problem, the capacitor bank 108 is placed downhole in a pressure vessel. All charging equipment 106 remains above ground. Transmission cables 114 of length of the borehole are used to transmit power to charge the necessary capacitor banks 108. The capacitor banks 108 now take the form of a cylinder to be placed inside a pressure vessel to withstand the required environmental pressure found at the depths of the well and the pressure from the blasts. The length of each pressure vessel is limited to accommodate the necessary minimum bend radius of the transition between the vertical and horizontal sections. Multiple pressure vessels are linked together like sausage links to accommodate the bend and to get sufficient volume to house the necessary capacitance to create the plasma blast. The capacitors 108 are designed to allow multiple blasts by recharging the capacitors in minutes.

Figure 2A:
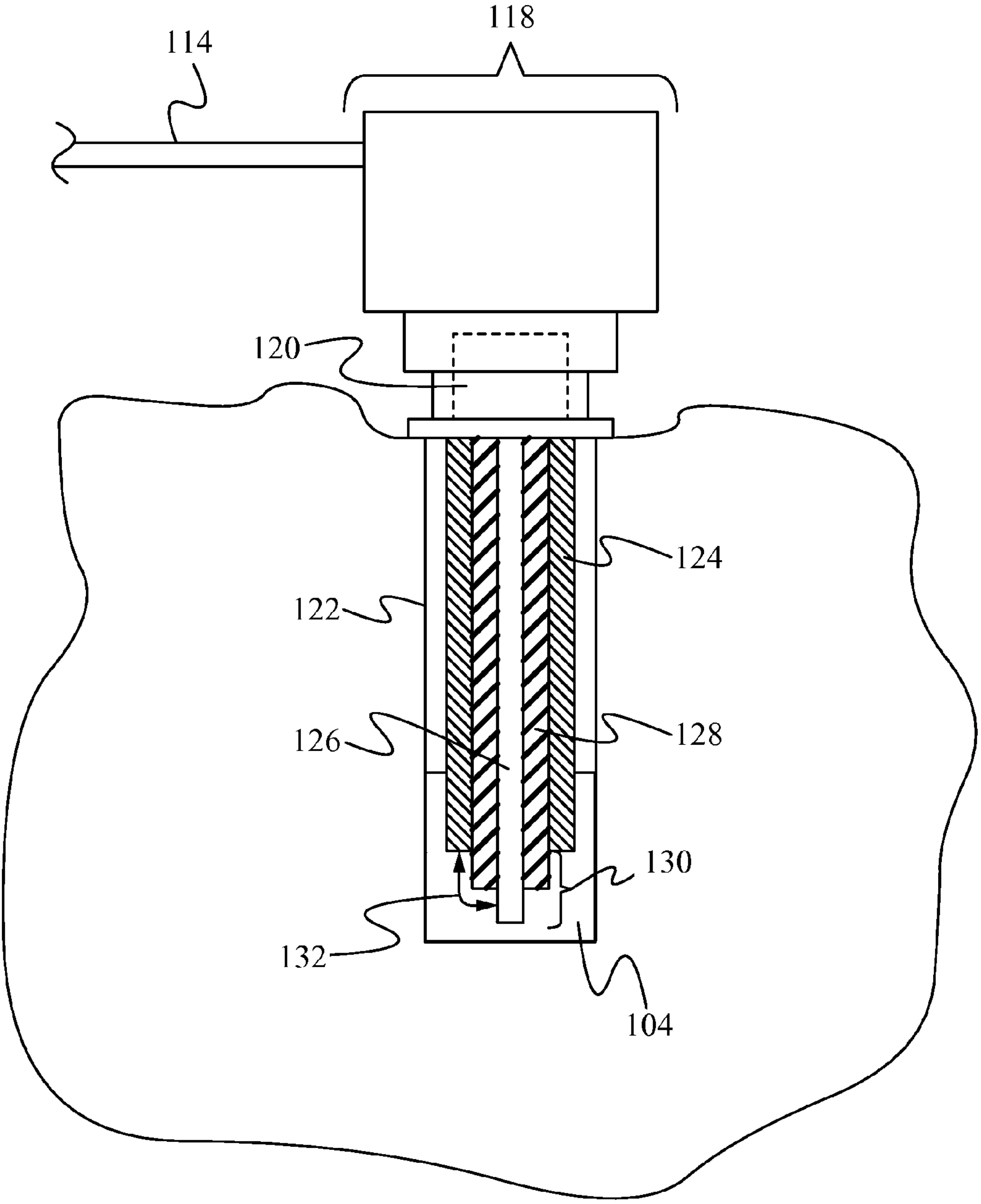
Fig. 2A Prior art
FIG. 2A shows a close-up view of the blasting probe in accordance with some embodiments of the Present Application.
Figure 2B:
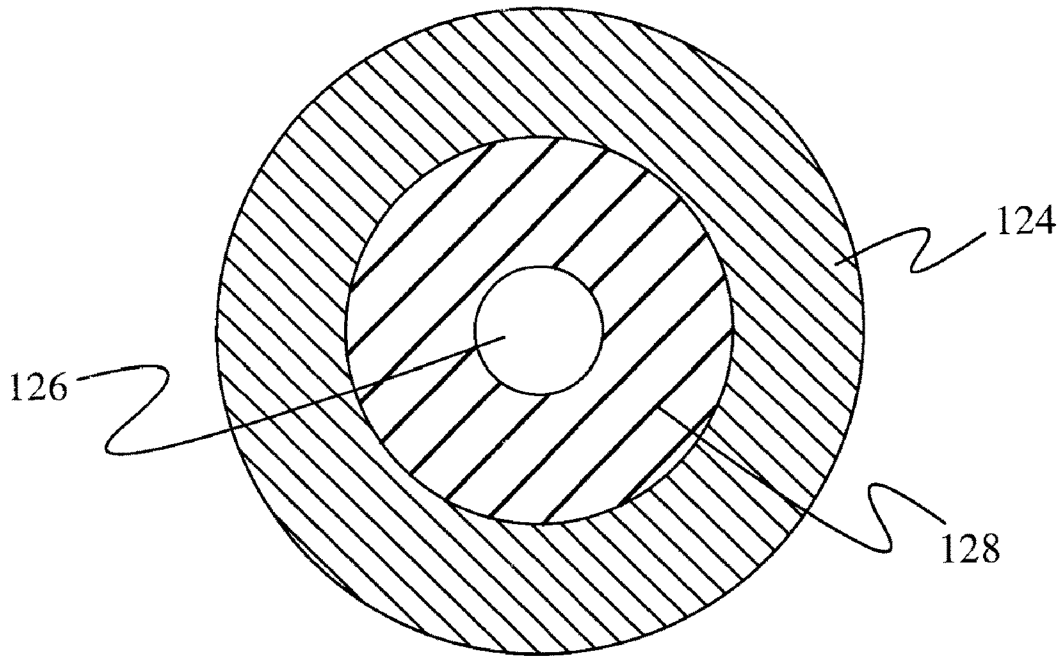
Fig. 2B Prior art
FIG. 2B shows an axial view of the blasting probe in accordance with some embodiments of the Present Application.
Figure 5A:
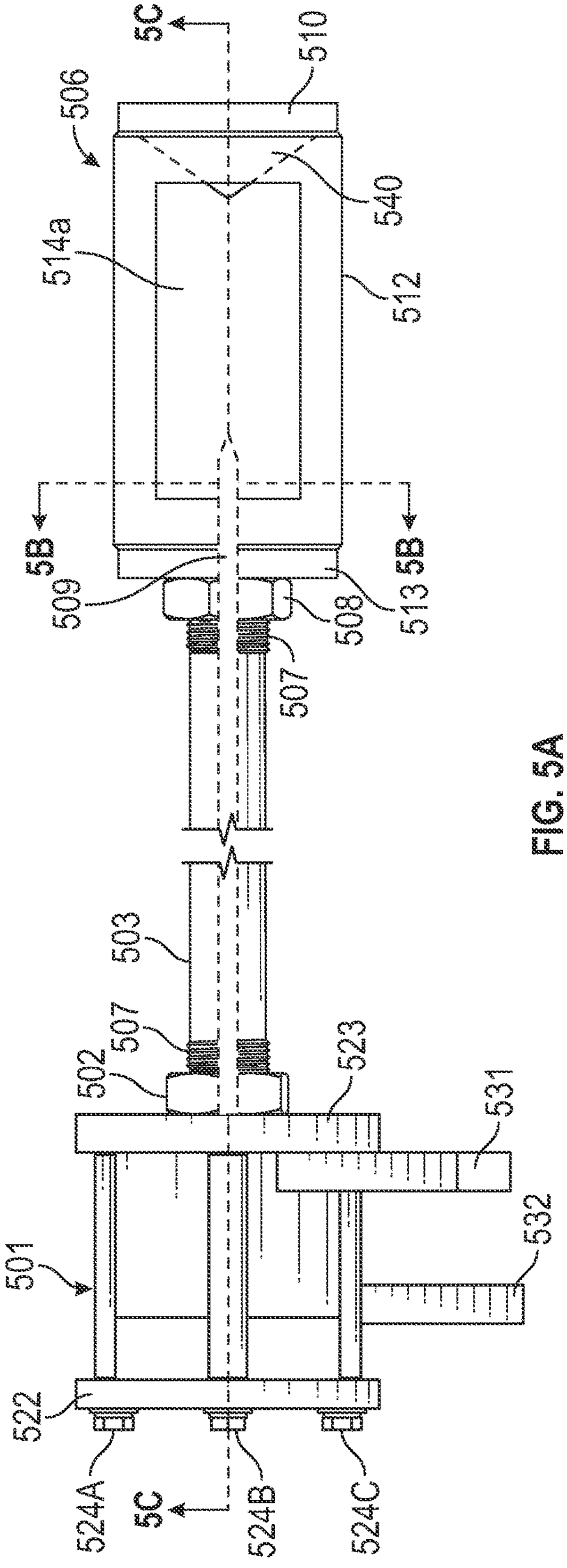
FIG. 5A shows a drawing of the robust probe from the head to the blast probe.
Figure 5B:
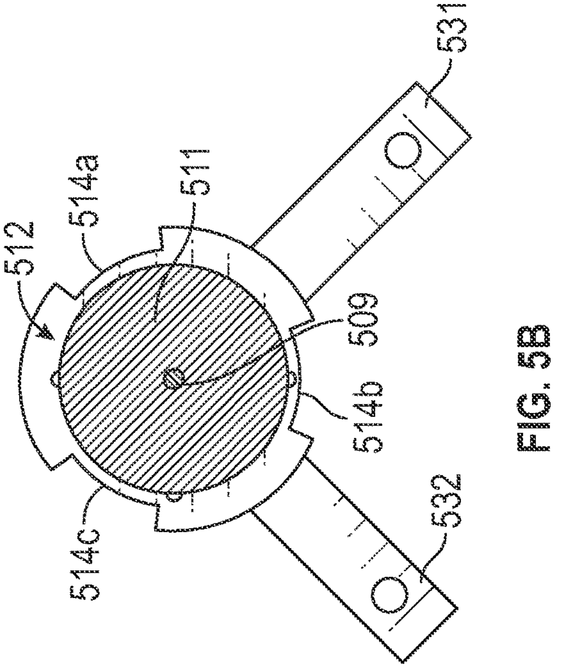
FIG. 5B shows a cross-sectional view of the robust probe from the head to the blast probe.

FIG. 2A shows one embodiment for a blasting probe. FIGS. 5A, 5B, SC, 6A, 6B and 6C show other embodiments. As seen in FIG. 2A, the blasting probe 118 comprises an adjustment unit 120, one or more ground electrodes 124, one or more high voltage electrodes 126 and a dielectric separator 128, wherein the end of the high voltage electrode 126 and the dielectric separator 128 constitute an adjustable blasting probe tip 130. The adjustable blasting probe tip 130 is reusable. Specifically, the adjustable blasting probe tip 130 comprises a material and is configured in a geometry such that the force from the blasts will not deform or otherwise harm the tip 130. Alternatively, any number of dielectric separators comprising any number and amount of different dielectric materials are able to be utilized to separate the ground electrode 124 from the high voltage electrode 126. In some embodiments, as shown in FIG. 2B, the high voltage electrode 126 is encircled by the hollow ground electrode 124. Furthermore, in those embodiments the dielectric separator 128 also encircles the high voltage electrode 126 and is used as a buffer between the hollow ground electrode 124 and the high voltage electrode 126 such that the three 124, 126, 128 share an axis and there is no empty space between the high voltage and ground electrodes 124, 126. Alternatively, any other configuration of one or more ground electrodes 124, high voltage electrodes 126 and dielectric separators 128 are able to be used wherein the dielectric separator 128 is positioned between the one or more ground electrodes 124 and the high voltage electrode 126. For example, the configuration shown in FIG. 2B could be switched such that the ground electrode was encircled by the high voltage electrode with the dielectric separator again sandwiched in between, wherein the end of the ground electrode and the dielectric separator would then comprise the adjustable probe tip.

The adjustment unit 120 comprises any suitable probe tip adjustment means as are well known in the art. Further, the adjustment unit 120 couples to the adjustable tip 130 such that the adjustment unit 120 is able to selectively adjust/move the adjustable tip 130 axially away from or towards the end of the ground electrode 124, thereby adjusting the electrode gap 132. In some embodiments, the adjustment unit 120 adjusts/moves the adjustable tip 130 automatically. The term "electrode gap" is defined as the distance between the high voltage and ground electrode 126, 124 through the blasting media 104. Thus, by moving the adjustable tip 130 axially in or out in relation to the end of the ground electrode 124, the adjustment unit 120 is able to adjust the resistance and/or power of the blasting probe 118. Specifically, in an electrical circuit, the power is directly proportional to the resistance Therefore, if the resistance is increased or decreased, the power is correspondingly varied. As a result, because a change in the distance separating the electrodes 124, 126 in the blasting probe 118 determines the resistance of the blasting probe 118 through the blasting media 104 when the plasma blasting system 100 is fired, this adjustment of the electrode gap 132 is able to be used to vary the electrical power deposited into the solid 102 to be broken or fractured. Accordingly, by allowing more refined control over the electrode gap 132 via the adjustable tip 130, better control over the blasting and breakage yield is able to be obtained.

In one oil and gas embodiment, the end of the probe 118 (or probe 506) is designed on an adjustable swivel to allow different fracture angles creating multidimensional cracks in the rock surrounding the well. Volume, flow, and pressure sensors are placed on the system to estimate the degree and ease of additional fracture volume and directionality of the blast. The electro hydraulic fracturing system has the following benefits over existing systems. First of all, an increased fracture volume is produced as fractures will be multi-dimensional and not just along a single plane as occurs with chemical blasting. Second, increased fracture volume and length is produced due to the ability of the system to execute repetitive blasts along a single plane. Furthermore, the amount of liquid needed to inject into the cracks is reduced, which leads to a decrease in the contamination of water supplies.

Another embodiment, as shown in FIG. 3, is substantially similar to the embodiment shown in FIG. 2A except for the differences described herein. As shown in FIG. 3, the blasting probe 118 comprises an adjustment unit (not shown), a ground electrode 324, a high voltage electrode 326, and two different types of dielectric separators, a first dielectric separator 328A and a second dielectric separator 328B. Further, in this embodiment, the adjustable blasting probe tip 330 comprises the end portion of the high voltage electrode 326 and the second dielectric separator 328B. The adjustment unit (not shown) is coupled to the high voltage electrode 326 and the second dielectric separator 328B (via the first dielectric separator 328A), and adjusts/moves the adjustable probe tip 330 axially away from or towards the end of the ground electrode 324, thereby adjusting the electrode gap 332. In some embodiments, the second dielectric separator 328B is a tougher material than the first dielectric separator 328A such that the second dielectric separator 328B better resists structural deformation and is therefore able to better support the adjustable probe tip 330. Similar to the embodiment in FIG. 2A, the first dielectric 328A is encircled by the ground electrode 324 and encircles the high voltage electrode 326 such that all three share a common axis. However, unlike FIG. 2A, towards the end of the high voltage electrode 326, the first dielectric separator 328A is supplanted by a wider second dielectric separator 328B which surrounds the high voltage electrode 326 and forms a conic or parabolic support configuration as illustrated in the FIG. 3. The conic or parabolic support configuration is designed to add further support to the adjustable probe tip 330. Alternatively, any other support configuration could be used to support the adjustable probe tip. Alternatively, the adjustable probe tip 330 is configured to be resistant to deformation. In some embodiments, the second dielectric separator comprises a polycarbonate tip. Alternatively, any other dielectric material is able to be used. In some embodiments, only one dielectric separator is able to be used wherein the single dielectric separator both surrounds the high voltage electrode throughout the blast probe and forms the conic or parabolic support configuration around the adjustable probe tip. In particular, the embodiment shown in FIG. 3 is well suited for higher power blasting, wherein the adjustable blast tip tends to bend and ultimately break. Thus, due to the configuration shown in FIG. 3, the adjustable probe tip 330 is able to be reinforced with the second dielectric material 328B in that the second dielectric material 328B is positioned in a conic or parabolic geometry around the adjustable tip such that the adjustable probe tip 330 is protected from bending due to the blast.

In one embodiment, water is used as the blasting media 104. The water could be poured down the borehole 122 before or after the probe 118 is inserted in the borehole 122. In some embodiments, such as horizontal boreholes 122 or bore holes 122 that extend upward, the blasting media 104 could be contained in a balloon or could be forced under pressure into the hole 122 with the probe 118. In an oil and gas applications, typically there is water present in the deep boreholes, so water does not need to be added. In some embodiments, silica sand and propellant are added to the water in the blasting media 104.

As shown in FIGS. 1 and 2, the blasting media 104 is positioned within the borehole 122 of the solid 102, with the adjustable tip 130 and at least a portion of the ground electrode 124 suspended within the blasting media 104 within the solid 102. Correspondingly, the blasting media 104 is also in contact with the inner wall of the borehole 122 of the solid 102. The amount of blasting media 104 to be used is dependent on the size of the solid and the size of the blast desired and its calculation is well known in the art.

Figure 4:
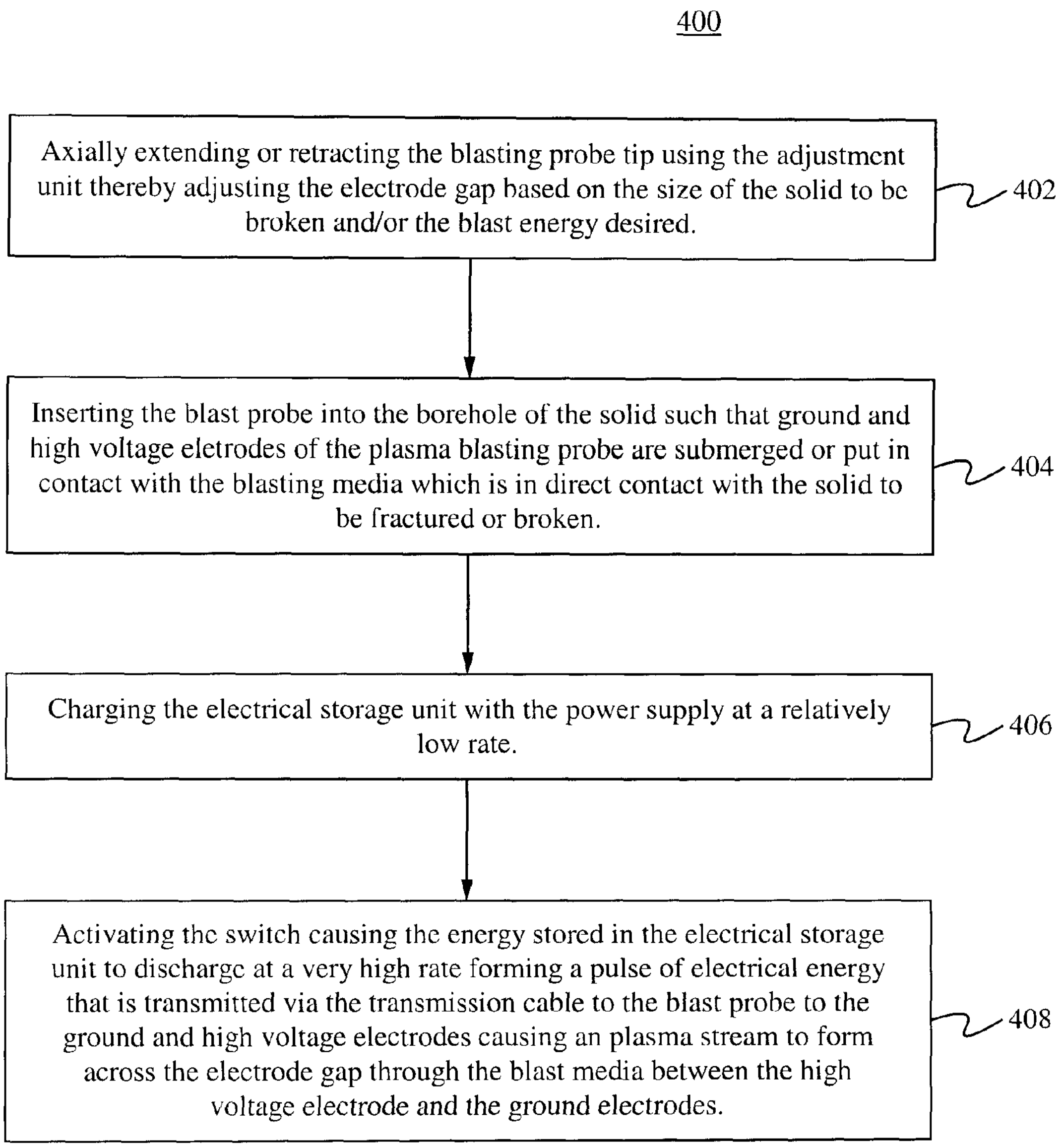
Fig. 4 Prior art
FIG. 4 shows a flow chart illustrating a method of using the plasma blasting system to break or fracture a solid in accordance with some embodiments of the Present Application.

The method and operation 400 of the plasma blasting system 100 will now be discussed in conjunction with a flow chart illustrated in FIG. 4. In operation, as shown in FIGS. 1 and 2, the adjustable tip 130 is axially extended or retracted by the adjustment unit 120 thereby adjusting the electrode gap 132 based on the size of the solid 102 to be broken and/or the blast energy desired at the step 402. The blast probe 118 is then inserted into the borehole 122 of the solid such that at least a portion of the ground and high voltage electrodes 124, 126 of the plasma blasting probe 118 are submerged or put in contact with the blasting media 104 which is in direct contact with the solid 102 to be fractured or broken at the step 404. Alternatively, the electrode gap 132 is able to be adjusted after insertion of the blasting probe 118 into the borehole 122. The electrical storage unit 108 is then charged by the power supply 106 at a relatively low rate (e.g., a few seconds) at the step 406. The switch 112 is then activated causing the energy stored in the electrical storage unit 108 to discharge at a very high rate (e.g. tens of microseconds) forming a pulse of electrical energy (e.g. tens of thousands of Amperes) that is transmitted via the transmission cable 114 to the plasma blasting probe 118 to the ground and high voltage electrodes 124, 126 causing a plasma stream to form across the electrode gap 132 through the blast media 104 between the high voltage electrode 126 and the ground electrode 124 at the step 408.

During the first microseconds of the electrical breakdown, the blasting media 104 is subjected to a sudden increase in temperature (e.g. about 5000 to 10,000° C.) due to a plasma channel formed between the electrodes 124, 126, which is confined in the borehole 122 and not able to dissipate. The heat generated vaporizes or reacts with part of the blasting media 104, depending on if the blasting media 104 comprises a liquid or a solid respectively, creating a steep pressure rise confined in the borehole 122. Because the discharge is very brief, a blast wave comprising a layer of compressed water vapor (or other vaporized blasting media 104) is formed in front of the vapor containing most of the energy from the discharge. It is this blast wave that then applies force to the inner walls of the borehole 122 and ultimately breaks or fractures the solid 102. Specifically, when the pressure expressed by the wave front (which is able to reach up to 2.5 GPa), exceeds the tensile strength of the solid 102, fracture is expected. Thus, the blasting ability depends on the tensile strength of the solid 102 where the plasma blasting probe 118 is placed, and on the intensity of the pressure formed. The plasma blasting system 100 described herein is able to provide pressures well above the tensile strengths of common rocks (e.g. granite=10-20 MPa, tuff=1-4 MPa, and concrete=7 MPa). Thus, the major cause of the fracturing or breaking of the solid 102 is the impact of this compressed water vapor wave front which is comparable to one resulting from a chemical explosive (e.g., dynamite).

As the reaction continues, the blast wave begins propagating outward toward regions with lower atmospheric pressure. As the wave propagates, the pressure of the blast wave front falls with increasing distance. This finally leads to cooling of the gasses and a reversal of flow as a low-pressure region is created behind the wave front, resulting in equilibrium.

If the blasting media 104 comprises a thixotropic fluid as discussed above, when the pulsed discharge vaporizes part of the fluid, the other part rheologically reacts by instantaneously increasing in viscosity, due to being subjected to the force of the vaporized wave front, such that outer part of the fluid acts solid like. This now high viscosity thixotropic fluid thereby seals the borehole 122 where the blasting probe 118 is inserted. Simultaneously, when the plasma blasting system 100 is discharged, and cracks or fractures begin to form in the solid 102, this newly high viscosity thixotropic fluid temporarily seals them thereby allowing for a longer time of confinement of the plasma. Thus, the vapors are prevented from escaping before building up a blast wave with sufficient pressure. This increase in pressure makes the blasting process 400 described herein more efficient, resulting in a more dramatic breakage effect on the solid 102 using the same or less energy compared to traditional plasma blasting techniques when water or other non-thixotropic media are used.

Similarly, if the blasting media 104 comprises an ER fluid as discussed above, when the pulsed discharge vaporizes part of the fluid, a strong electrical field is formed instantaneously increasing the non-vaporized fluid in viscosity such that it acts solid like. Similar to above, this now high viscosity ER fluid thereby seals the borehole 122 where the blasting probe 118 is inserted. Simultaneously, when the plasma blasting system 100 is discharged, and cracks or fractures begin to form in the solid 102, this newly high viscosity ER fluid temporarily seals them thereby allowing for a longer time of confinement of the plasma. Thus, again the vapors are prevented from escaping before building up a blast wave with sufficient pressure.

FIG. 5A shows an alternative embodiment of the blast probe. The robust probe 506 utilizes a ground casing tube 512 around air 511 (in the bore hole, this may be replaced by the blast media) that surrounds a high voltage electrode 509. The ground casing tube 512 has three rectangular openings 514*a,b,c* equally (in some embodiments) located around the circumference of the ground casing tube 512. The number of openings, the size and the proportions of the rectangular openings 514*a,b,c* may vary without deviating from the disclosure herein.

The robust probe 506 may be capped with a threaded top probe plate 513 and a bottom probe plate 510, both threaded and screwed into the ground casing 512. The threaded bottom probe plate 510 could be round with a diameter of slightly less than 3 inches and perhaps ⅜$^{th}$ inch thick. The threaded bottom probe plate 510 may have holes in the side for tightening when screwing the bottom plate 510 to the ground casing tube 512 or the bottom plate 510 may have opposing flat surfaces on the circumference or an hexangular set of flat surfaces, all for the purpose of accepting a wrench or socket for tightening. Similarly, the top probe plate 513 may incorporate the holes, flat surfaces or hexangular surfaces to facilitate tightening. The threaded top probe plate 510 may be round with a diameter of slightly less than 3 inches and perhaps ⅜$^{th}$ inch thick. The dimensions can vary without detracting from the inventions herein. The material for the ground casing 512 and the top and bottom probe plates 510, 513 could be steel or any other conductive material such as copper, aluminum, steel, iron, bronze, graphite, precious metals, carbon fiber, etc.

The threaded bottom probe plate 510 may have a ground deflector 540 attached on the inside of the ground casing 512. In some embodiments, the ground deflector 540 is shaped as a cone. In other embodiments, the ground deflector 540 is in the shape of a pyramid, with one side facing each of the rectangular openings 514*a, b, c*. In still another embodiment, the pyramid faces of the ground defector 540 could be shaped, perhaps in a convex shape, to further focus the blast energy. In some embodiments, the angle of the cone (or pyramid) of the ground deflector 540 is 38.66°. In some embodiments, the ground deflector 540 has a threaded hole in the center of the bottom plane, to allow the ground deflector 540 to be screwed into the bottom probe plate 510. In some embodiments, the ground deflector 540 is made of low-carbon steel. In other embodiments, the ground deflector 540 is made of other conductive materials such as copper, aluminum, steel, iron, bronze, graphite, precious metals, carbon fiber etc.

Figure 5C:
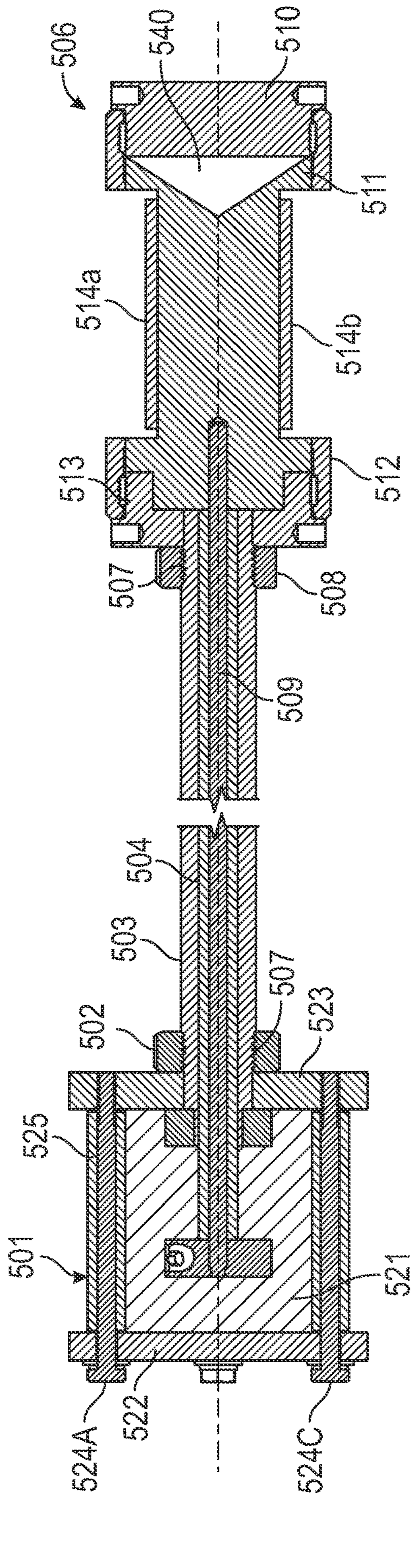
FIG. 5C shows a longitudinal view of the robust probe from the head to the blast probe.
Figure 5D:
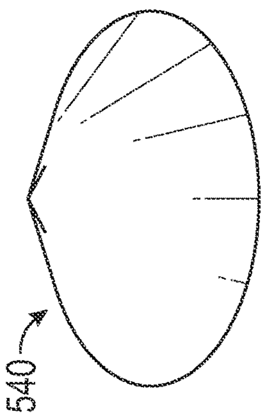
FIG. 5D shows the deflector cone.
Figure 5E:
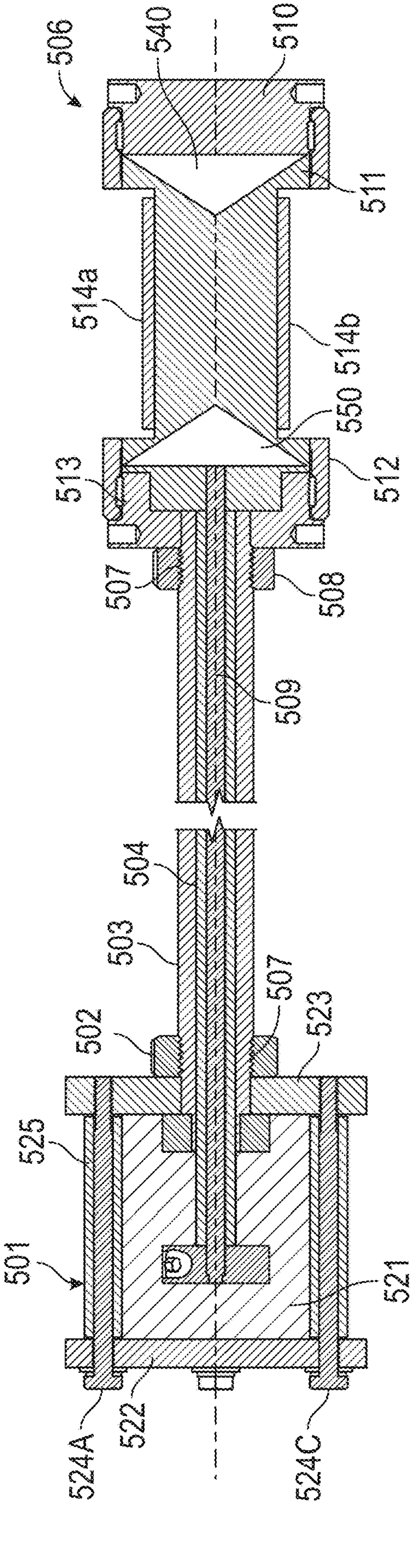
FIG. 5E shows a longitudinal view of the robust probe from the head to the blast probe.

The high voltage electrode 509 may have an electrode deflector 550 (similar to the ground deflector 540 but attached to the electrode 509) attached at the end on the inside of the ground casing 512, as seen in FIG. 5E. A dielectric material 504 (such as a G-10 insulator), which surrounds the high voltage electrode 509, may separate the electrode deflector 550 from the threaded top probe plate 513. In some embodiments, the electrode deflector 550 is shaped as a cone. In other embodiments, the electrode deflector 550 is in the shape of a pyramid, with one side facing each of the rectangular openings 514 a, b, c. In still another embodiment, the pyramid faces of the electrode defector 550 could be shaped, perhaps in a convex shape, to further focus the blast energy. In some embodiments, the angle of the cone (or pyramid) of the electrode deflector 550 is 38.66°. In some embodiments, the electrode deflector 550 has a threaded hole in the center of the bottom plane, to allow the electrode deflector 550 to be screwed into the high voltage electrode 509. In some embodiments, the electrode deflector 550 is made of low-carbon steel. In other embodiments, the electrode deflector 550 is made of other conductive materials such as copper, aluminum, steel, iron, bronze, graphite, precious metals, carbon fiber etc.

FIG. 5B shows a cross section of the robust probe 506. At the center of the sliced elliptical probe 506 is the high voltage electrode 509. The high voltage electrode 509 could be a brass rod or wire, although other embodiments could use any other conductive material such as copper, aluminum, steel, iron, bronze, graphite, precious metals, etc. The high voltage electrode 509 may be surrounded by air or blast media. The outer layer of the robust probe 506 could be a steel tube with the rectangular openings 514*a,b,c* removed. In some embodiments, the diameter of the steel tube 512 is 3 inches, and the probe tube has a length of 5.5 inches. The rectangular cut-outs 514*a,b,c* could be 3 inches by 1.56 inches equally spaced around the probe 506, in some embodiments.

FIG. 5A provides an overall view of the entire blast probe assembly. FIG. 5C shows a longitudinal view of the sliced and elliptical probe from the head to the blast probe. The probe subassembly 506 is connected to the head subassembly 501 by a steel tube 503. In one embodiment, the steel tube 503 is threaded 507 on both ends and the head assembly 501 is screwed onto the steel tube 503, and held tight by a nut 502. Similarly, the probe subassembly 506 is screwed into the steel tube 503, and held tight with a nut 508. In other embodiments, one or both the head subassembly 501 and the probe subassembly 506 could be could be connected to the steel tube 503 through welding, soldering, pressure connection, 3D printing into a single piece, casting into a single assembly, or similar methods of connection. The steel tube 503 encloses a dielectric material 504 (such as a G-10 insulator), which surrounds the high voltage electrode 509.

The head subassembly 501, in one embodiment, is a steel head tube 525, about 3.5 inches in length (the length can vary widely), filled with a dielectric material 521 such as a G-10 insulator (high-pressure fiberglass laminate). FR-4 (a flame-retardant brominated epoxy), CDM (Durostone, a heavy-duty glass fiber reinforced plastic for high temperature applications), polycarbonate, rubber, plastic, Teflon, fiberglass, porcelain, ceramic, quartz, etc.). In one embodiment, the head assembly 501 is capped with a round steel plate at each end 522, 523. The head subassembly 501 is held together with steel bolts 524A,BC. While three bolts 524A,B,C are shown, any number of bolts can be used without deviating from the inventions herein. The top steel plate 522 could be a circle slightly less than 3 inches in diameter and perhaps ¼" thickness. The top steel plate 522 may be drilled to accept the bolts. However, these dimensions can change without deviating from the inventions. The dimensions used here are for a 3-inch borehole, larger dimensions are needed for different sized boreholes. The bottom steel plate 523 could be the same diameter and thickness as the top steel plate 522. The bottom steel plate 523 may be drilled and tapped to accept the bolts 524A,B,C. In addition, the bottom steel plate 523 could be drilled and tapped to accept the steel tube 503. While the material of the head tube 525, the bolts 524A,B,C, the top plate 522, and the bottom plate 523 are described here as steel, any other conductive material such as copper, aluminum, steel, iron, bronze, graphite, precious metals, etc could be used. In some embodiments, the head tube 525 and the bolts 524A,B,C could be a dielectric material. In some embodiments, the head tube 525 is not included.

In FIGS. 5A and 5B, optional brass lug bars 531, 532 are shown. These lug bars 531, 532 are used as high voltage and ground connections in some installations, such as shallow boreholes and in test configurations. The ground lug bar 531 is connected to the bottom plate 523 either with one or more screws or bolts, solder, or welding to provide a solid ground connection to the bottom plate 523. The high voltage lug bar 532 passes through the head tube 525 (if present) with a dielectric separator and passes through the dielectric material 521 to connect to the high voltage electrode 509. The connection between the high voltage electrode 509 and the high voltage lug bar 532 could be welding, soldering, or one or more screws or bolts A high voltage wire from the transmission cable 114 is connected to the high voltage lug bar 532 and the ground wire from the transmission cable 114 is connected to the ground lug bar 531.

In an alternative embodiment, a hole is drilled in the center of the top plate 522 and the transmission cable 114 passes through the top plate 522, possibly with some form of dielectric insulator between the transmission cable 114 and the top plate 522. Inside the head assembly 501, inside of the dielectric material 521, the transmission cable 114 splits with the ground wire passing down and connecting to the bottom plate 523 with solder, weld, or one or more screws or bolts. The high voltage wire from the transmission cable 114 is connected to the high voltage electrode 509 with solder, weld, or one or more screws or bolts. In other embodiments the transmission cable 114 connects into the head assembly 501 through other methods, such as directing the transmission cable 114 down the side of the head assembly 501 to the lug bars 531,532 or directly to the electrode 509 and the bottom plate 523.

The method of and apparatus for plasma blasting described herein has numerous advantages. Specifically, by adjusting the size and shape of the blasting probe's cutout 514*a,b,c*, the plasma blasting system is able to provide better control over the power deposited into the location in the borehole to be broken.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. Al dimensions are given as examples, and may be changed without detracting from the inventions herein.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A blasting system comprising:
- a borehole;
- a blast probe positioned within the borehole, the blast probe comprising a high voltage electrode,
  - a dielectric material surrounding the high voltage electrode,
  - a ground casing tube surrounding blast media, said ground casing tube connected to an electrical ground,
  - a threaded, removable ground deflector, shaped to direct a plasma blast force away from ends of the blast probe, screwed into the electrical ground at an opposite end of the ground casing tube from the high voltage electrode; and
- a plurality of openings in a side of the ground casing tube; and the blast media comprising water or other incompressible fluid wherein the high voltage electrode and the ground casing tube are submerged in the blast media.

2. The blasting system of claim 1 wherein the ground deflector is pyramidical shaped.

3. The blasting system of claim 2 wherein the ground deflector has three sides.

4. The blasting system of claim 1 wherein the ground deflector is conical in shape.

5. The blasting system of claim 1 wherein the ground deflector is low-carbon steel.

6. The blasting system of claim 1 wherein the high voltage electrode connects to an electrode deflector.

7. The blasting system of claim 6 wherein the electrode deflector is pyramidical shaped.

8. The blasting system of claim 7 wherein the electrode deflector has three sides.

9. The blasting system of claim 6 wherein the electrode deflector is conical in shape.

10. The blasting system of claim 6 wherein the electrode deflector is low-carbon steel.

11. A blast probe apparatus comprising:
- a high voltage electrode;
- a dielectric material surrounding the high voltage electrode;
- a ground casing tube surrounding blast media, said ground casing tube connected to an electrical ground;
- a threaded, removable ground deflector, shaped to direct a plasma blast force away from ends of the blast probe apparatus, attached to the electrical ground at an opposite end of the ground casing tube from the high voltage electrode; and
- a plurality of openings in a side of the ground casing tube.

12. The blast probe apparatus of claim 11 wherein the ground deflector is pyramidical shaped.

13. The blast probe apparatus of claim 12 wherein the ground deflector has three sides.

14. The blast probe apparatus of claim 11 wherein the ground deflector is conical in shape.

15. The blast probe apparatus of claim 11 wherein the ground deflector is low-carbon steel.

16. A blast probe apparatus comprising:
- a high voltage electrode;
- a threaded, removable electrode deflector screwed into the high voltage electrode;
- a dielectric material surrounding the high voltage electrode;
- a ground casing tube surrounding blast media, said ground casing tube connected to an electrical ground; and
- a plurality of openings in a side of the ground casing tube.

17. The blast probe apparatus of claim 16 wherein the electrode deflector is pyramidical shaped.

18. The blast probe apparatus of claim 17 wherein the electrode deflector has three sides.

19. The blast probe apparatus of claim 16 wherein the electrode deflector is conical in shape.

20. The blast probe apparatus of claim 16 wherein the electrode deflector is low-carbon steel.

* * * * *